US 6,593,995 B1

(12) United States Patent
Hogestyn

(10) Patent No.: US 6,593,995 B1
(45) Date of Patent: Jul. 15, 2003

(54) DUAL MODE DOCUMENT SCANNER WITH VARIABLE PLATEN LEVEL TRANSITION

(75) Inventor: Richard C. Hogestyn, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/122,900

(22) Filed: Apr. 12, 2002

(51) Int. Cl.[7] .................. G03B 27/52; G03B 27/32; G03B 27/62

(52) U.S. Cl. .................. 355/41; 355/26; 355/75

(58) Field of Search .................. 355/25, 26, 24, 355/40, 41, 407, 75; 271/114, 121; 358/474

(56) References Cited

U.S. PATENT DOCUMENTS

| 4,982,236 A | 1/1991 | Bock |
| 5,012,275 A | 4/1991 | Bock |
| 5,339,139 A | 8/1994 | Fullerton et al. |
| 5,596,399 A | * 1/1997 | Dempsey et al. ............. 399/45 |
| 5,640,252 A | 6/1997 | Turner et al. |
| 5,659,405 A | 8/1997 | Prevost et al. |
| 5,680,204 A | 10/1997 | Ferrara |
| 5,778,277 A | 7/1998 | Wenthe, Jr. et al. |
| 6,182,961 B1 | * 2/2001 | Wenth, Jr. ............. 271/114 |

* cited by examiner

Primary Examiner—Henry Hung Nguyen

(57) ABSTRACT

In dual mode document imaging systems for either scanning a stationary document with a moving document imager on a large fixed platen or feeding documents past an imaging station on an adjacent smaller platen with the same document imager held there stationary, the smaller platen is mounted to allow vertical movement to allow for different thickness of documents being fed relative to a fixed axis of rotation constant velocity document transport. Thin flexible transition members bridge the outer edges of the gap between the lower surface of the vertically movable smaller platen and the lower surface of the fixed platen to allow the document imager to laterally slide freely, on focal distance maintaining slide pads, across a small gap between the bottom surface of one platen and the bottom surface of the other, with the document imager being spring biased upwardly towards the lower surfaces of both platens.

9 Claims, 4 Drawing Sheets

DUAL MODE DOCUMENT SCANNER WITH VARIABLE PLATEN LEVEL TRANSITION

Figure 1:
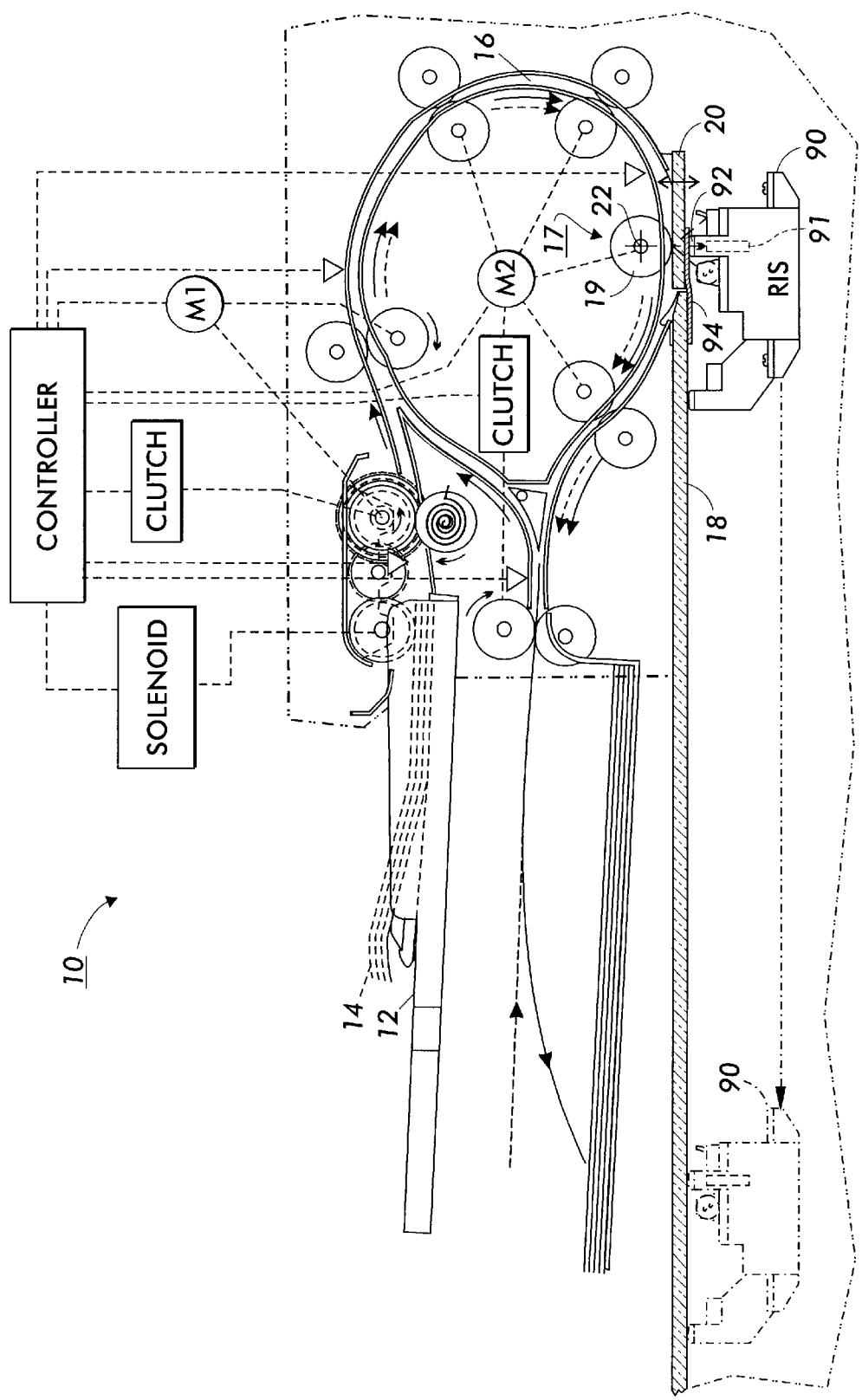

This application relates to dual mode document imaging systems, for either scanning a stationary document with a moving document imager on a large fixed platen or feeding documents past an imaging station on an adjacent smaller platen with the same document imager held stationary.

In the disclosed embodiment the smaller platen is mounted to allow vertical movement, to allow for different thickness of documents being fed to that platen yet allow the use of a fixed axis of rotation substantially constant velocity document transport. That can cause different bottom surface levels of the two platens. As disclosed, thin flexible transition members bridge the outer edges of the gap between the lower surface of the vertically movable smaller platen and the lower surface of the fixed platen to allow the document imager to laterally slide freely, on focal distance maintaining slide pads, across a small gap between the bottom surface of one platen and the bottom surface of the other, with the document imager being spring biased upwardly towards the lower surfaces of both platens.

By way of background, various types of dual mode document handlers (document feeders and imagers) and platen scanners are known in the art. The following patent disclosures are noted by way of some examples: Xerox Corp. U.S. Pat. No. 5,339,139, issued Aug. 16, 1994, "Document Feeder with Positive Document Removal From Imaging Platen" by Jack K. Fullerton, et al; Xerox Corp. U.S. Pat. No. 5,680,204, issued Oct. 21, 1997, "Dual Scanning Electronic Reprographic Document Handler" by Joseph J. Ferrara; and Xerox Corp. U.S. Pat. No. 5,012,275, issued Apr. 30, 1991, "Right-to-Left Scanning System for Copying Documents or Bound Books" by Edward C. Bock. An example of typical prior art on having the optics unit ride on fixed rails, with no other connection to, or control by, the platen or image plane position, is disclosed in Xerox Corp. U.S. Pat. No. 4,982,236, issued Jan. 1, 1991, entitled "Self Supporting Optical Document Scanning System" by Edward C. Bock.

Of particular interest to the subject of full width array document scanning system in which the imaging unit has slide pads engaging the bottom surface of the document platen glass are Xerox Corp. U.S. Pat. No. 5,778,277 issued Jul. 7, 1998 to Stephen J. Wenthe, Jr., et al and U.S. Pat. No. 5,659,405 issued Aug. 19, 1997 to Charles F. Prevost, et al.

Further by way of background, and as illustrated in the cited and other art, low cost scanners or copiers with automatic or semi-automatic document feeding by document handlers may have a rigid or fixed axis substantially constant velocity transport (CVT) document feeding roll, and a small platen glass under the CVT roll to provide for the image positional alignment of the document being fed and scanned by an imager held stationary under that small platen at that imaging position while the documents are fed over the top of that small platen. Typically, the optics for these scanners or copiers have been half rate systems riding on fixed rails with a light lens and a CCD digital imaging array, because such low cost scanners or copiers often also desirably have a much larger adjacent platen for individually scanning stationary documents with that same optics unit. That is, scanning the documents manually placed on that larger platen with moving optics. If the smaller adjacent CVT fed documents imager platen would be vertically spring loaded for floating (to accommodate different thickness documents being fed), a vertical step difference would occur between the large fixed platen used for manual document scanning and the floating platen of the document feeder. However, that would not allow full width array (FWA) or other optics units or modules to instead ride on or be guided by the bottom side of the platen to maintain the depth of focus. That requires both platens to be the same or integral rigidly held glass having and maintaining the same bottom plane. To accommodate different thickness documents with such a fixed platen would require a floating or variable axis position CVT instead of fixed CVT roll in the document handler. However, a floating CVT requires a flexible drive connection which adds complexity and may vary the desired constant velocity needed for uniform imaging of the moving document.

A specific feature of the specific embodiment disclosed herein is to provide a dual mode document handler in which documents may be imaged by the same document imager by (a) scanning a document on the upper surface of a large stationary document platen by moving said document imager under the lower surface of said larger stationary document platen, or by (b) feeding documents with a document transporting system past a moving documents imaging station on the upper surface of a smaller platen with said document imager positioned under the lower surface of said smaller platen, wherein the documents are fed by said document transporting system to said upper surface of said smaller platen, the improvement comprising mounting said smaller platen adjacent to but independently movable relative to said larger stationary document platen with a small gap in between said smaller platen and said larger stationary document platen, biasing said smaller platen for said independent movement towards said larger stationary document to allow different spacing of said upper surface of said smaller platen from said document transporting system for different thickness of said documents being fed from said document transporting system to said upper surface of said smaller platen, providing a flexible transition member bridging said gap between said lower surface of said smaller platen and said lower surface of said larger stationary document platen, said document imager being biased towards said lower surface of said smaller platen and said lower surface of said larger stationary document platen, and said document imager having platen engagement members allowing lateral movement of said document imager relative to said lower surface of said smaller platen and said lower surface of said larger stationary document platen and said flexible transition member, said platen engagement members maintaining the document imaging focus of said document imager relative to both said independently movable smaller platen and said larger stationary document platen.

Further specific features disclosed in the embodiment herein, individually or in combination, include those wherein said document transporting system comprises at least one document drive roller adapted to be rotatably driven at a substantially constant velocity on a fixed axis of rotation, and/or wherein said platen engagement members comprise plural low friction slide pad members, and/or wherein said flexible transition member comprises thin flexible strips adhered to adjacent areas of said lower surface of said smaller platen and said lower surface of said larger stationary document platen, and/or wherein said flexible transition member comprises thin flexible strips of MYLAR® adhered to adjacent areas of said lower surface of said smaller platen and said lower surface of said larger stationary document platen on opposite sides of said moving document imaging station, and/or wherein said platen engagement members comprise plural low friction slide pad members slidable on said lower surface of said smaller platen and said lower surface of said larger stationary document is platen and said flexible transition member, and/or a dual mode method of document imaging with a document handler in which documents may be imaged by the same document imager by scanning a document on the upper surface of a large stationary document platen by moving said document imager under the lower surface of said larger stationary document platen, or alternatively, feeding documents with a document transporting system past a moving documents imaging station on the upper surface of a smaller platen with said document imager positioned under the lower surface of said smaller platen, mounting said smaller platen adjacent to but independently movable relative to said larger stationary document platen with a small gap in between said smaller platen and said larger stationary document platen, biasing said smaller platen for said independent movement towards said larger stationary document to allow different spacing of said upper surface of said smaller platen from said document transporting system for different thickness of documents being fed from said document transporting system to said upper surface of said smaller platen, providing a flexible transition member bridging said gap between said lower surface of said smaller platen and said lower surface of said larger stationary document platen, said document imager being biased towards said lower surface of said smaller platen and said lower surface of said larger stationary document platen, and said document imager having platen engagement members allowing lateral movement of said document imager relative to said lower surface of said smaller platen and said lower surface of said larger stationary document platen and said flexible transition member, said platen engagement members maintaining the document imaging focus of said document imager relative to both said smaller and independently movable platen and said larger stationary document platen, and/or wherein said document transporting system comprises at least one document drive roller adapted to be rotatably driven at a substantially constant velocity on a fixed axis of rotation, and/or wherein said platen engagement members comprise plural low friction slide pad members slidable on said lower surface of said smaller platen and said lower surface of said larger stationary document platen and said flexible transition members.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular component mountings, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Figure 2:
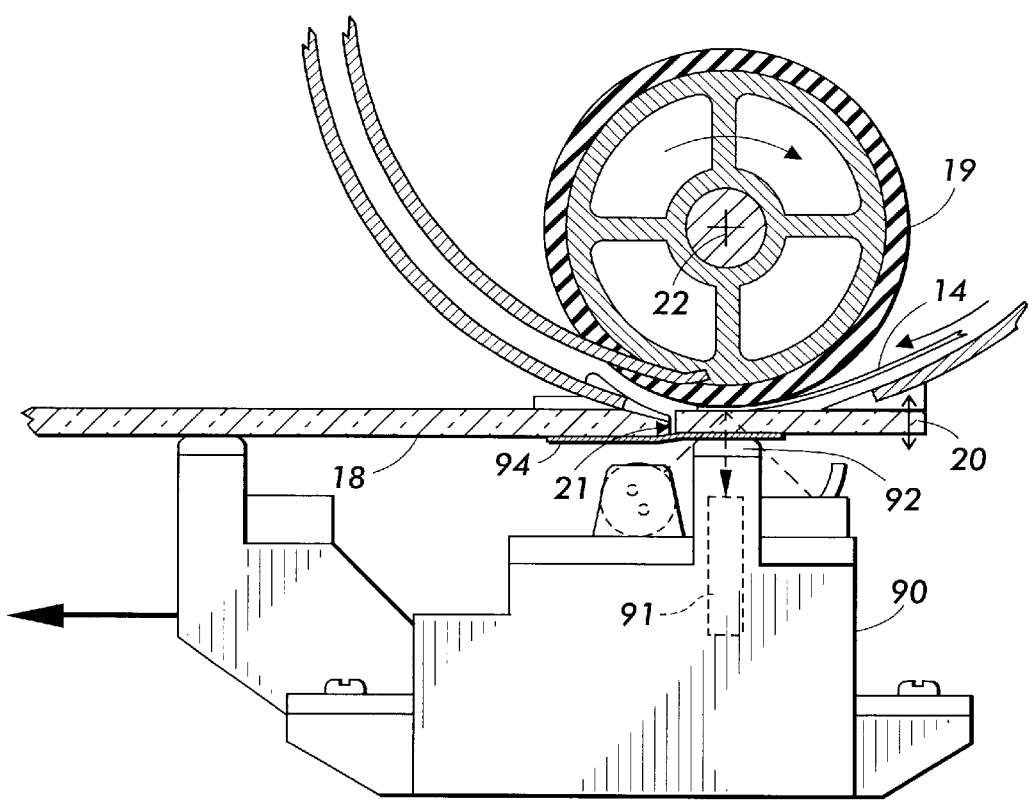
Figure 3:
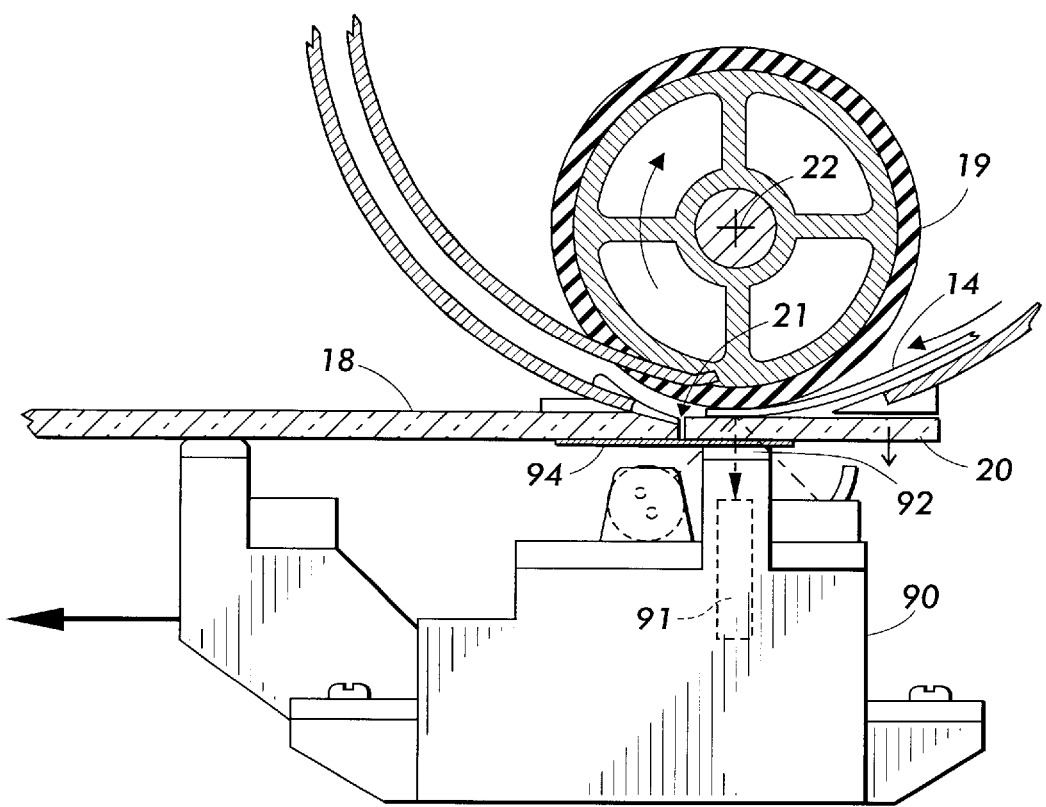
Figure 4:
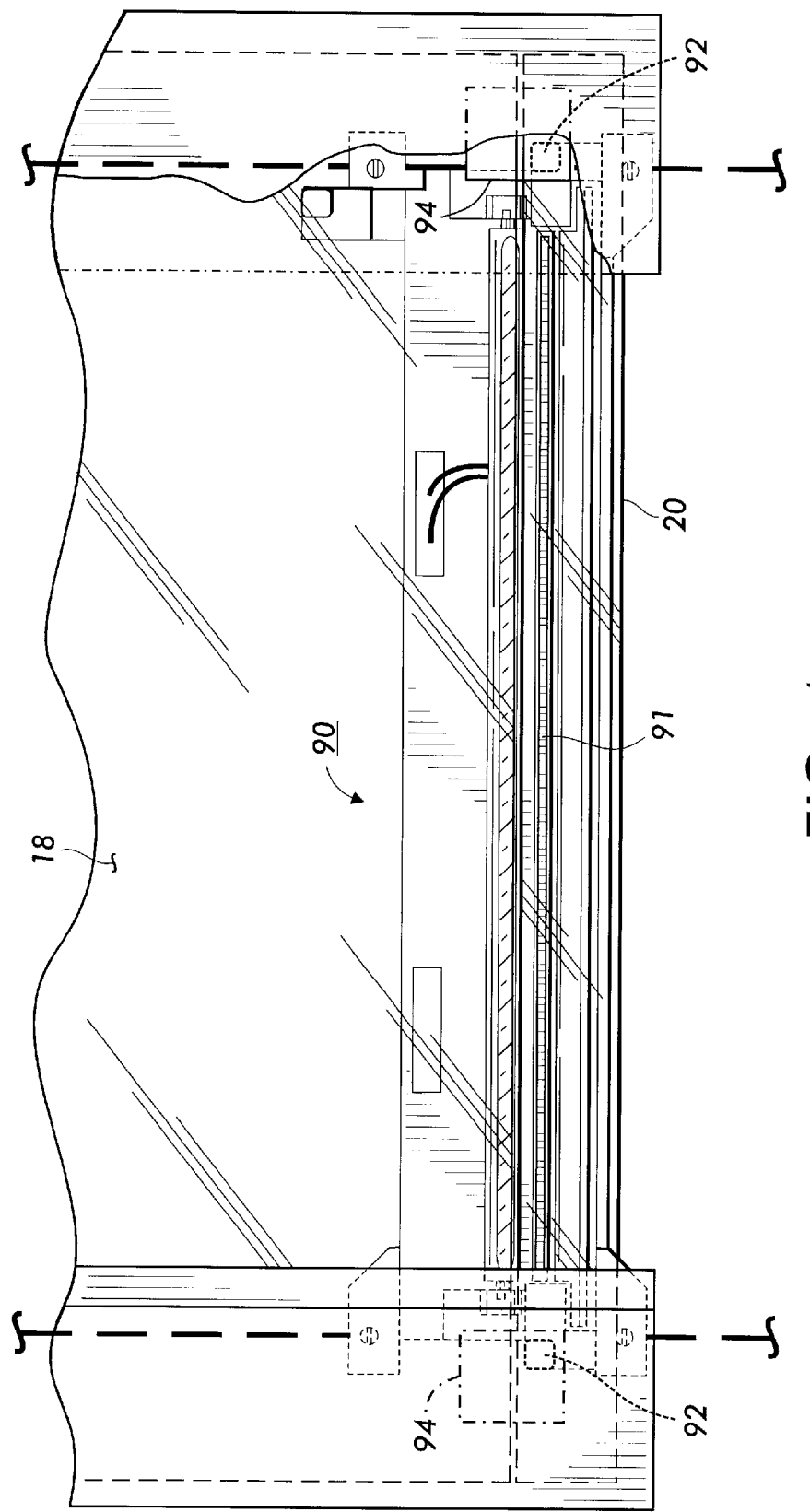

Various of the above-mentioned and further features and advantages will be apparent to those skilled in the art from the specific apparatus and its operation or methods described in the example below, and the claims. Thus, the present invention will be better understood from this description of a specific embodiment, including the drawing figures (which are approximately to scale) wherein:

FIG. 1 is a frontal plan view of an exemplary document handler, with a schematic dual mode or dual function utilization of a single optics-imager unit, shown parked under the small platen of a CVT moving document imaging station but movable as shown in phantom to scan under an adjacent full size platen for scanning stationary documents, but with the small platen allowed to move vertically to conform to the moving document, and with one example of the subject transition system allowing the optics unit to ride on and spatially conform to the bottom surface of both platens even though they may be at slightly different vertical levels due to the vertical movement of the small platen;

FIGS. 2 and 3 are enlarged and more detailed partial views of the optics unit parked under the small platen of the CVT moving document imaging station of FIG. 1;

FIGS. 2 and 3 are substantially identical to one another, but the vertical position of the small platen has moved downwardly in FIG. 3, as compared to FIG. 2, due to an increase in the thickness of the sheet of paper being fed to the imaging station in FIG. 3 as compared to FIG. 2; and FIG. 4 is a partial top view, looking down through the small CVT imaging station platen glass and a partially broken-away adjacent area of the large manual platen, illustrating that the optics unit's platen bottom surface engaging slide pads are aligned with both the CCD (or other) imager bar of the optics unit and the centerline of the imaging station, and that these two slide pads and the two thin flexible platen-interconnecting strips they may slide over need only be provided at the outside ends of the platen, thus not interfering with the document imaging area of the imager bar.

Disclosed in this particular embodiment is a dual mode digital document scanner in which full width digital imager array optics unit may ride against, and thus be vertically aligned to, the fixed bottom surface of a fixed platen stationary document imaging area, and in which that same full width digital imager array optics unit may smoothly transition to ride against, and thus be variably vertically aligned by, the variable vertical position bottom surface of a second and floating platen under an adjacent moving document transport document handler. There is provided a flexible transitional connecting surface member between the bottom surface of said fixed platen and the bottom surface of said floating platen which allows said optics unit to transverse a vertical position mismatch between the bottom surface of said fixed platen and the bottom surface of said floating platen yet maintain optical focus to the image plane.

Describing now in further detail the exemplary embodiment with reference to the Figures, there is shown a dual mode document handler 10, by way of one example thereof. For convenience, this example of a document handler 10 is generally similar to the above-cited Xerox Corp. U.S. Pat. No. 5,339,139 (except for the differences described herein) and thus need not be re-described herein. However, it will be appreciated that the present invention is not limited to this exemplary apparatus or configuration. Document sheets 14 to be imaged while moving may, as shown in FIG. 1, be automatically individually fed from an stack of sheets in an input tray 12 by a document feeder into sheet path 16 to the CVT imaging station 17, where, as shown in FIGS. 2 or 3, a CVT transport roller 19 engages and feeds the sheet 14 at a constant velocity while pressing the imaged area of the sheet 14 against the upper surface of the small (narrow) transparent glass imaging platen 20 for imaging by the RIS imaging optics unit 90. The RIS is part of a known type of imaging unit 90 having slide pads 92 providing a low friction surface, e.g. TEFLON®. As shown in the solid line positions of FIGS. 2 and 3, and also in FIG. 4, these slide pads 92 are biased to maintain engagement with the bottom surface of the platen 20, to thus maintain a consistent focal distance from the upper surface of the (floating) platen 20, and hence from the document 14 being imaged.

An additional slide pad may be provided substantially laterally to the side pads 92, as shown, so as to prevent tilting of the imaging unit 90. This additional slide pad can be always engaging only the large platen 18. A rear slide rail system may also be provided for maintaining the front to rear positioning of the imaging unit 90 as the imaging unit 90 slides laterally (as shown by its movement arrow) on its slide pads 92 along the bottom surfaces of the platens.

Although a single roll 19 (or common axis plural rolls) CVT is shown, it will be appreciated that there are other known CVT systems in which there is a pair of CVT rolls spaced on opposite sides of the imaging area 17 and a floating baffle holds the document down against the platen in imaging area. However, this adds further complications in insuring equal and constant feeding velocities by the two spaced apart CVT rolls, which must acquire and release the document sheet at different times.

Note that if a CVT system of moving document scanning were to try to hold both the CVT roller axis fixed and also its engaged imaging platen fixed, and rely on compression of an elastomeric CVT roller to accommodate the document thickness, that the CVT roller effective radius in the sheet drive nip would have to change, which would change the sheet feeding velocity for sheets of different thickness. Nor could any significant gap be provided, or easily accurately maintained, between the CVT roller surface and the platen upper surface in their feeding nip without risking loss of sufficient normal force engagement of thin sheets to feed thin sheets reliably. Thus, gravity or spring biasing the CVT roller against the platen, or vice versa, with a relatively constant engagement bias force that allows one or the other component to "float" apart to accommodate different document thicknesses without changing other parameters is desirable.

When the alternate mode of scanning is desired in this example, that involves here the scanning of a stationary document on the other, large, platen 18. Desirably, that scanning is by the same single optics unit 90 and its slide pads 92 moving under that other platen 18, as shown by the movement arrow and phantom line position thereof. For each return to the first mode of automatic document feeding and scanning, the optics unit 90 must then return back to its imaging station 17 position. Schematically shown by the heavy dashed lines in FIG. 4 is a conventional cable drive system connecting to the opposite outer ends (shown in phantom) of the optics unit 90.

However, it has been found that the transitional movement of the optics unit 90 slide pads 92 between the two platens 18 and 20 is complicated by a desire to not have to float or move the drive axis of rotation 22 of the CVT drive roller 19, and to float the CVT platen instead. As noted, floating the CVT roller axis would add drive complications, e.g., a constant velocity drive connector or the like, and/or cause fluctuations in the sheet 14 driven velocity, which could cause RIS output image changes.

Although not specifically shown, it is well known to have the optics unit slide or roll on, and be moved along on for scanning, fixed slide rods or rails, as disclosed for example in the above-cited Xerox Corp. U.S. Pat. No. 4,982,236, issued Jan. 1, 1991 by Edward C. Bock. If utilized in this example, it could be easily modified to have a simple spring mounting between the part of the optics unit riding or sliding on those rails and the main component of the optics unit which is spring-loaded upwardly so that that the slide pads thereof stay engaged with the bottom surfaces of the platens. That would positively maintain image plane spacing without requiring critical manufacturing and set up tolerances in the parallelism and spacing of the slide rails relative to the platen.

Thus, it is deemed more desirable to have a document handler 10 as here with a fixed axis 22 CVT roll 19, a fixed manual platen 18, and a "floating" CVT platen 20. As schematically illustrated by movement arrows, the small platen 20 may be biased upwardly by, e.g., conventional foam or leaf springs, towards contact with the CVT roll 19 in the imaging station 17, so as to compress any of document 14 in that nip against the fixed position CVT roll 19, irrespective of variations in the thickness or thinness of the particular document 14 being fed. By also spring loading the full width array (FWA) optics unit 90 and its slide pads 92 up against the bottom side of the small platen glass 20, when the platen glass 20 moves upwardly for a thinner document 14 as in FIG. 2 the optics unit moves upwardly by the same distance, maintaining focus with the document in the imaging station 17. The optics unit or document imager may be conventionally spring biased upwardly towards the lower surfaces of both platens as shown in the above-cited and incorporated references. When a thicker document pushes the platen 20 downwardly as shown in FIG. 3 the optics unit 90 is pushed down by the same distance, to likewise maintain focus for its imager bar 91, which may be a conventionally, commercially available, full document width array of multiple CCD photosites raster input scanner (RIS). (Only one of the main slide pads 92 shows in FIGS. 2 and 3, but there are preferably least two, respectively engaging the inner and outer ends of the platens, as shown in FIG. 4.) Preferably, as the small platen is pushed up against the stationary, fixed axis, CVT document feeding unit, the upper surface of the small platen engages pads on the lower surface of the CVT unit, as shown. This maintains a small fixed spacing or gap between the small platen and the rotating CVT roller sufficient to reduce wear or marking of the glass when no document is being fed, yet small enough to provide uniform sheet feeding through that nip between the CVT roller and the small platen.

However, the variations in vertical position of the platen 20 with different sheet thickness, and/or manufacturing and mounting tolerances of such a floating platen and fixed axis CVT system, mean that there may be a step or vertical transition preventing or interfering with movement of the optics unit 90's optical spacing and positioning slide pads 92 transitionally sliding from one platen to another (from the surface of platen 18 to the bottom surface of platen 20, or vice versa).

It has been found that a solution to this transitioning problem is to affix, by adhesive, in the areas where the two slide pads 92 will slide during that transition, two thin MYLAR® or the like transitioning strips 94 of flexible and relatively low friction material to the bottom side of platens, inboard and outboard, outside of the imaging station area. The transitioning strips 94 are desirably of sufficient thickness to give some beam strength to span a small gap 21 provided here between the closely adjacent ends of the platens 18 and 20. However, that gap 21 need only be sufficient to allow uncritical vertical movement of the CVT platen 20 relative to the manual platen 18, e.g., only about one or two millimeters. The strips 94 should desirably be thin enough to allow the feet or slide pads 92 of the optical unit 90 FWA module to transverse the gap smoothly and also not to stub on any exposed ends of these strips 94. The strips 94 material may be, alternatively, stainless steel, leaf spring steel, or other suitable material.

The CVT platen 20 thickness may be, if desired, slightly thinner than that of the manual platen glass 18, by subtracting the flexible strip 94 thickness if the flexible strip 94 is affixed to the bottom of the platen 20 extending into the imaging area 17, as shown here. This will maintain uniform distance and thus depth of focus from the bottom surface of the strips 94 to the top surface of the platen 20 in that case.

It is also desirable, as shown to have the center of the slide pad 92 centered in the imaging station 17 and in line with the centerline of the RIS image plane. This minimizes RIS positional location error from any rotation of the optics unit 90 that may be caused by any rotation of the floating CVT platen.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a dual mode document handler in which documents are imaged by a document imager by (a) scanning a document on the upper surface of a large stationary document platen by moving said document imager under the lower surface of said larger stationary document platen, or by (b) feeding documents with a document transporting system past a moving documents imaging station on the upper surface of a smaller platen with said document imager positioned under the lower surface of said smaller platen, wherein the documents are fed by said document transporting system to said upper surface of said smaller platen, the improvement comprising:

mounting said smaller platen adjacent to but independently movable relative to said larger stationary document platen with a small gap in between said smaller platen and said larger stationary document platen, biasing said smaller platen for said independent movement towards said larger stationary document to allow different spacing of said upper surface of said smaller platen from said document transporting system for different thickness of said documents being fed from said document transporting system to said upper surface of said smaller platen, providing a flexible transition member bridging said gap between said lower surface of said smaller platen and said lower surface of said larger stationary document platen, said document imager being biased towards said lower surface of said smaller platen and said lower surface of said larger stationary document platen, and said document imager having platen engagement members allowing lateral movement of said document imager relative to said lower surface of said smaller platen and said lower surface of said larger stationary document platen and said flexible transition member, said platen engagement members maintaining the document imaging focus of said document imager relative to both said independently movable smaller platen and said larger stationary document platen.

2. The dual mode document handler of claim 1, wherein said document transporting system comprises at least one document drive roller adapted to be rotatably driven at a substantially constant velocity on a fixed axis of rotation.

3. The dual mode document handler of claim 1, wherein said platen engagement members comprise plural low friction slide pad members.

4. The dual mode document handler of claim 1, wherein said flexible transition member comprises thin flexible strips adhered to adjacent areas of said lower surface of said smaller platen and said lower surface of said larger stationary document platen.

5. The dual mode document handler of claim 1, wherein said flexible transition member comprises thin flexible strips of polyester film adhered to adjacent areas of said lower surface of said smaller platen and said lower surface of said larger stationary document platen on opposite sides of said moving document Imaging station.

6. The dual mode document handler of claim 1, wherein said platen engagement members comprise plural low friction slide pad members slidable on said lower surface of said smaller platen and said lower surface of said larger stationary document platen and said flexible transition member.

7. A dual mode method of document imaging with a document handler in which documents are imaged by a document imager by scanning a document on the upper surface of a large stationary document platen by moving said document imager under the lower surface of said larger stationary document platen, or alternatively, feeding documents with a document transporting system past a moving documents imaging station on the upper surface of a smaller platen with said document imager positioned under the lower surface of said smaller platen, mounting said smaller platen adjacent to but independently movable relative to said larger stationary document platen with a small gap in between said smaller platen and said larger stationary document platen, biasing said smaller platen for said independent movement towards said larger stationary document to allow different spacing of said upper surface of said smaller platen from said document transporting system for different thickness of documents being fed from said document transporting system to said upper surface of said smaller platen, providing a flexible transition member bridging said gap between said lower surface of said smaller platen and said lower surface of said larger stationary document platen, said document imager being biased towards said lower surface of said smaller platen and said lower surface of said larger stationary document platen, and said document imager having platen engagement members allowing lateral movement of said document imager relative to said lower surface of said smaller platen and said lower surface of said larger stationary document platen and said flexible transition member, said platen engagement members maintaining the document imaging focus of said document imager relative to both said smaller and independently movable platen and said larger stationary document platen.

8. The dual mode method of document imaging of claim 7, wherein said document transporting system comprises at least one document drive roller adapted to be rotatably driven at a substantially constant velocity on a fixed axis of rotation.

9. The dual mode method of document imaging of claim 7, wherein said platen engagement members comprise plural low friction slide pad members slidable on said lower surface of said smaller platen and said lower surface of said larger stationary document platen and said flexible transition members.

* * * * *